United States Patent [19]
Smith, III

[11] Patent Number: 5,339,861
[45] Date of Patent: Aug. 23, 1994

[54] HYDRAULIC COUPLING WITH HOLLOW METAL O-RING SEAL

[75] Inventor: Robert E. Smith, III, Missouri City, Tex.

[73] Assignee: National Coupling Company, Inc., Stafford, Tex.

[21] Appl. No.: 36,464

[22] Filed: Mar. 24, 1993

[51] Int. Cl.5 .............................................. F16L 29/00
[52] U.S. Cl. ............................. 137/614.04; 251/149.7
[58] Field of Search ................. 137/614.04, 614.05, 137/614.02, 614; 251/149.7, 149.6, 214

[56] References Cited

U.S. PATENT DOCUMENTS

| | | | |
|---|---|---|---|
| 1,814,479 | 7/1931 | Metcalf, Jr. | |
| 1,913,982 | 6/1933 | Fox | |
| 2,976,066 | 3/1961 | Antoniades et al. | 286/10 |
| 3,046,026 | 7/1962 | Burrows | 277/171 |
| 3,116,944 | 1/1964 | Parker | 285/332.2 |
| 3,147,015 | 9/1964 | Hanback | 277/205 |
| 3,378,269 | 4/1968 | Castor | 277/205 |
| 3,519,278 | 7/1970 | Fuhrmann et al. | 277/153 |
| 4,086,939 | 5/1978 | Wilcox et al. | 137/614.03 |
| 4,694,859 | 9/1987 | Smith, III | 137/614.04 |
| 4,709,726 | 12/1987 | Fitzgibbons | 137/614.04 |
| 4,834,139 | 5/1989 | Fitzgibbons | 137/614.04 |
| 4,854,615 | 8/1989 | Smith, III | 285/331 |
| 4,915,397 | 4/1990 | Nicholson | 277/206 |
| 5,029,613 | 7/1991 | Smith, III | 137/614.04 |
| 5,099,882 | 3/1992 | Smith, III | 137/614.04 |

FOREIGN PATENT DOCUMENTS 1325023 of 1973 United Kingdom .

OTHER PUBLICATIONS

EnerRing Resilient Metal Gaskets Design Manual.

Primary Examiner—Martin P. Schwadron
Assistant Examiner—Kevin L. Lee
Attorney, Agent, or Firm—Arnold, White & Durkee

[57] ABSTRACT

An undersea hydraulic coupling with a hollow metal o-ring seal for sealing between the male and female members is disclosed. The hollow metal o-ring seal is held captive between an internal shoulder and a retainer insertable into the internal bore of the female member. The retainer may be slidable to compress the metal o-ring seal axially. The metal o-ring seal also may be pressure-energized to expand the seal cavity in response to fluid pressure in the coupling.

13 Claims, 1 Drawing Sheet

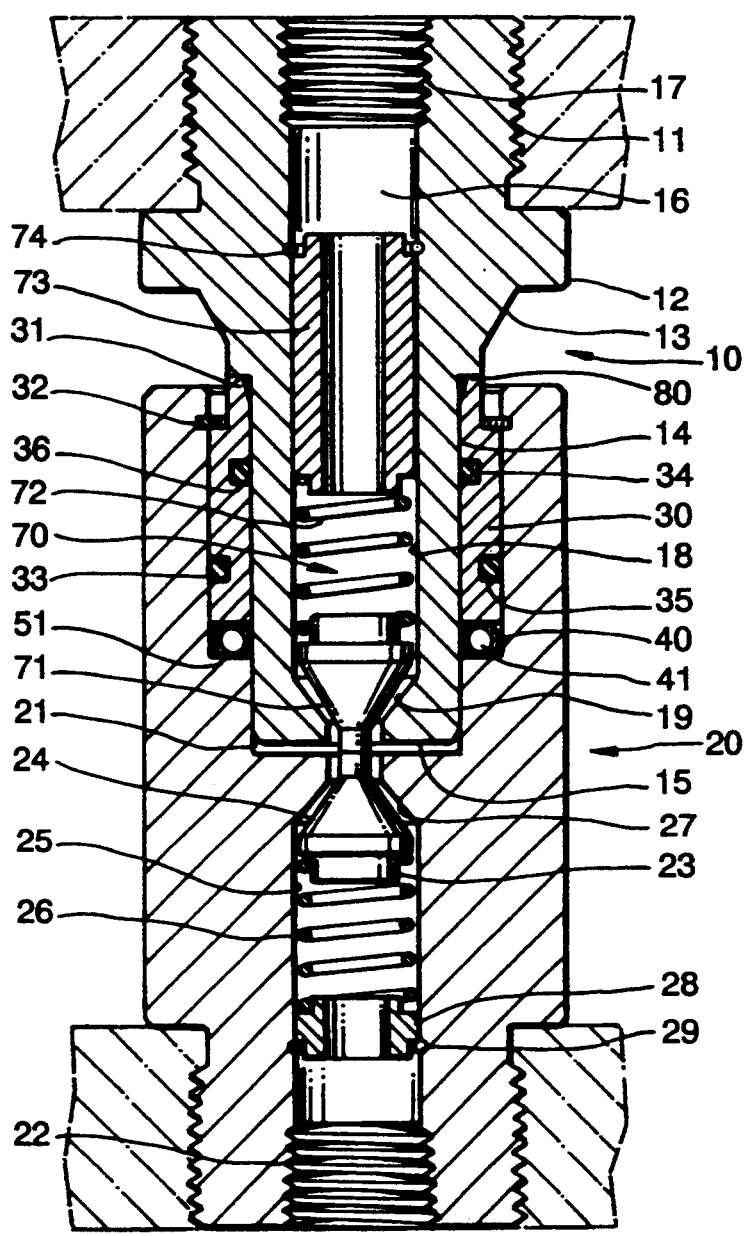

HYDRAULIC COUPLING WITH HOLLOW METAL O-RING SEAL

BACKGROUND OF THE INVENTION

I. Field of the Invention

The present invention relates to hydraulic couplings used in undersea drilling and production applications and seals used in those couplings. More particularly, the invention involves an undersea hydraulic coupling with a metal o-ring seal for sealing the junction between the male and female members of the coupling.

II. Related Art

Subsea hydraulic couplings are old in art. The couplings generally consist of a male member and a female member with seals to seal the junction between the male and female members.

The female member generally has a cylindrical body with a relatively large diameter longitudinal bore at one end and a relatively small diameter longitudinal bore at the other. The small bore facilitates connections to hydraulic lines, while the large bore contains the seals and receives the male portion of the coupling. The male member includes a cylindrical portion at one end to facilitate connection to hydraulic lines. When the cylindrical portion of the male member is inserted into the large bore of the female member, according to various embodiments of the device, seals either abut the end or face of the male member or engage the male member about its circumference. The hydraulic fluid is then free to flow through the female and male portions of the couplings, and seals prevent that flow from escaping about the joints in the coupling.

A check valve may be installed in the female member and also in the male member. Each check valve is open when the coupling is made up; however, each check valve closes when the coupling is broken, so as to prevent fluid from leaking out the system of which the coupling is a part.

Soft seals used in undersea hydraulic couplings have numerous disadvantages, the principle ones being (1) The inability of the seal to withstand the deteriorating effects of the subsea environment for extended periods of time; and (2) The inability of the soft seal to contain the higher pressures being imposed on the hydraulic systems.

A metal seal is available which better withstands both deteriorating effects of the environment and higher pressures. That seal is a crush-type seal which is positioned between the end of the male portion of the coupling and the internal end of the large bore in the female portion. When the male portion is inserted into the female, the metal seal is crushed between the two portions and the seal is effectuated between the two. In view of 15 the crushing action, the seal can be used only once. If the coupling is separated for any reason, the once crushed seal can be replaced with a new seal. An example of this type of coupling and seal is shown in U.S. Pat. No. 3,918,485.

Another type of hydraulic coupler with a metal seal is disclosed in U.S. Pat. No. 4,647,470. As may be seen, this design uses a v-shaped metal seal. The metal V-seal rests in the female member and is only effective when it is tightly compressed by pressure from the leading face of the male member. This means that substantial forces are needed to lock the coupling in the first place and to keep it locked under the necessary pressure. This design could leak even upon slight separation of the male and female coupling members, which is a problem because of the internal pressures when each hydraulic line is pressured up, as discussed above. The v-seal coupling requires a pre-load mechanism to prevent separation of the coupling members. Extremely close tolerances are required both for the couplings and manifold plates. In principal, the v-seal coupling was reusable and the coupling could be disengaged and reengaged more than once without replacing the seal. In practice, however, the v-seal would quite often flip out or flip sideways when the coupling was disconnected. If the coupling was reconnected without repositioning the v-seal, the coupler would be damaged beyond use.

In U.S. Pat. No. 4,694,859 to Robert E. Smith, III, an undersea hydraulic coupling with a radial metal seal is disclosed. This coupling provides a reusable radial metal seal which engages the circumference of the probe when it is positioned within the female member body. The metal seal is held in place by a cylindrical body or retainer. The retainer prevents escape of the metal seal from the female member body. When the male and female portions of the coupling are parted under pressure, the retainer prevents the metal seal from blowing out through the bore of the female member. This coupling uses a pressure actuated metal c-ring seal. Among the advantages of this design are that it requires no pre-load mechanism, is tolerant to movement of the two halves of the coupling relative to one another, and allows greater tolerances between the couplings and the manifold plates. Rather than sealing with the leading face of the male member (as done by the v-seal coupling), this design uses a pressure energized metal c-seal for sealing with the outer circumference of the male member. The retainer also may be used to pre-load the metal c-seal by urging it radially inwardly to engage the circumference of the male member. This is accomplished by positioning the seal on a shoulder within the female member bore, then locking the retainer against the seal.

III. Summary of the Invention

The present invention provides an undersea hydraulic coupling with a hollow metal o-ring seal for sealing between the male and female members. The hollow metal o-ring seal is held captive between an internal shoulder and a retainer insertable into the female member bore. The retainer may be slidable to compress the hollow metal o-ring axially and urge it to expand inwardly against the male member and outwardly against the female member bore. A snap ring or other locking member prevents the retainer from coming out of the female member bore. As the male men%her is inserted, an outer shoulder on the male member pushes against the retainer, and the length of the retainer controls the force exerted against the hollow metal o-ring.

IV. BRIEF DESCRIPTION OF THE DRAWINGS

FIG. 1 is a section view of a male member connected to a female member according to a first embodiment of the present invention.

FIG. 2 is a section view showing the retainer and hollow metal o-ring seal according to a second embodiment of the present invention.

FIG. 3 is a section view of a retainer and a hollow metal o-ring seal according to a third embodiment of the present invention.

V. DETAILED DESCRIPTION OF THE PREFERRED EMBODIMENT

Undersea hydraulic couplings are generally connected to opposing plates of a manifold and are held together by bolts or hydraulic members attached to the plates. The male and female members may be attached to the opposing plates using various means, such as screws or threads. Techniques for attaching the members to such plates are well known to those skilled in the art.

FIG. 1 is a section view of a male member and female member according to a first embodiment of the invention. As shown, the main components of the coupling are male member or probe 10, female member or receiver 20, retainer 30, and metal o-ring 40. In the embodiment shown in FIG. 1, the male member or probe 10 comprises a handle 11 which may be threaded for attachment to a manifold plate. The handle terminates at flange 12 of the male member and tapered shoulder 13. Tapered shoulder 13 is tapered down to the first end of cylindrical probe wall 14 which terminates at probe face 15. The male member body includes external shoulder 80 between cylindrical probe wall 14 and tapered shoulder 13. This external shoulder is used to push against retainer 30 to axially compress the hollow metal o-ring seal, as will be discussed further below. The cylindrical probe wall 14 is adapted for sliding engagement with seal 40.

The body of the male member also is provided with a central bore 16. Bore 16 has several variations in its diameter as it extends through the body of the male member. In a preferred embodiment, the first end of the central bore comprises an internally threaded section 17 for connection to a hydraulic line. A cylindrical passageway 18 extends longitudinally within the male member body and terminates at valve seat 19 which is an inclined shoulder. Valve assembly 70 is slidably received within the central bore 16 of the male member. Valve assembly 70 comprises a conical poppet valve 71 which sealingly engages valve seat 19 in its normally closed position. Helical valve spring 72 is used to urge the popper valve into a closed position against the valve seat. The helical valve spring 72 is located within cylindrical passage 18 and anchored at spring collar 73 which is held in place by collar clip 74 inserted within the inner surface of the cylindrical passage of the male member.

Female member or receiver 20 comprises a body having a receiving chamber or bore 21 for receiving the male member or probe 10, and handle 22 which optionally may be threaded to a manifold plate (not shown). Valve assembly 23 of the female member comprises a popper valve 24 which is slidably received in cylindrical passageway 25 of female member 20. Popper valve 24 is conical in shape and is urged by valve spring 26 to a seated position against valve seat 27. When the popper valve is in the closed position against valve seat 27, it seals fluid from flowing between the male member and female member. Hollow spring collar 28 anchors the valve spring 26 and is held in place by collar clip 29. The valve assemblies 70 and 23 in the male and female members are positioned so that upon engagement of the male and female members, popper valve 71 in the male member and poppet valve 24 in the female member will be forced off seal seats 19 and 27.

Receiving chamber 21 of the female member includes at least one annular shoulder 51 for positioning the hollow metal o-ring seal 40. The hollow metal o-ring seal may be either a vented or non-vented metal seal. If the hollow metal o-ring seal is vented, the seal will be pressure energized by fluid pressure entering cavity 41 within the hollow metal o-ring seal. One or more vent holes between the exterior of the seal and the cavity 41 will pressurize cavity 41 and urge the cavity to expand and enhance the sealing effect.

The metal o-ring seal is axially compressible to expand radially inwardly against the male member or probe and radially outwardly against the female member receiving bore. To axially compress the hollow metal o-ring seal, retainer 30 includes rim portion 31 which is contacted by shoulder 80 of the male member. In the embodiment of FIG. 1, when shoulder 80 pushes against rim portion 31 of the retainer, the retainer is urged axially towards shoulder 51 to abut hollow metal o-ring seal 40. Snap ring 32 may be locked in a groove in the female bore, or an equivalent locking device may be threaded or otherwise attached to the female member to limit the axial movement of the retainer, and prevent the retainer from sliding out of the receiving chamber. Preferably, retainer 30 will have at least one seal 33 in groove 35 in its outer circumference to seal with the bore of the female member, and another seal 34 in groove 36 in its inner circumference to seal with the male men%her. These seals may be of a relatively pliable elastomeric material, for example, rubber or synthetic elastomer, and serve as backup to hollow metal o-ring seal 40.

The hollow metal o-ring seal is axially compressible to form a seal between the male member and the female member in an undersea hydraulic coupling. The seal is capable of regaining its original shape following compression. Preferably, the hollow metal o-ring seals are of the type manufactured for many years by Fluorocarbon, American Seal & Engineering and various others. The hollow metal o-ring seal may be gold or silver plated for metal to metal sealing, or have a non-metallic plating such as teflon.

When the male member enters the female member, it first engages backup seal 34. As the male member continues to enter the female member, shoulder 80 contacts rim portion 31 of retainer 30. As the male member continues into the female member receiving chamber, it pushes retainer 30 axially against the hollow metal o-ring seal, and urges the hollow metal o-ring seal to expand inwardly against the male member probe and outwardly against the female member bore. The hollow metal o-ring is therefore urged into sealing engagement with the male member and female member.

Other configurations used for the retainer, seal, and male member are contemplated with the present invention. For example, the retainer 30 may be split into two sections and either screwed together or dimensioned to allow the use of backup dovetail seals as shown in U.S. Pat. No. 4,900,071 assigned to National Coupling Co., Inc.

Now referring to FIG. 2 of the drawing, a second embodiment of the retainer, seal and male member is shown. In the embodiment of FIG. 2, retainer 90 is urged axially against hollow metal o-ring seal 40 when the first end 91 of the retainer is contacted by shoulder 92 of the male member or probe. In the embodiment of FIG. 2, the shoulder 92 of the male member or probe is located in the cylindrical wall of the male member.

In the embodiment of FIG. 3 spring washer 95 (such as a bellville spring) is positioned between shoulder 92 of the male member and retainer 96. Spring washer 95 pushes retainer 97 axially and allows the male member to float within the female member bore and compensate for coupler mounting, movement and deflexing. Snap-ring 98 may be used to hold the spring washer in place. Therefore, spring washer 95 helps maintain the hollow metal o-ring seal 40 in a compressed state.

Although variations in the embodiment of the present invention may not each realize all the advantages of the invention, certain features may become more important than others in various applications of the device. Therefore, the invention should be understood to be limited only by the scope of the appended claims.

What is claimed:

1. An undersea hydraulic coupling comprising:
   a female member having a longitudinal bore, an annular shoulder in the bore, and a slidable valve for controlling fluid flow therethrough;
   a male member insertable into the female member bore, having a slidable valve for controlling fluid flow therethrough, and an annular shoulder on the outer surface thereof;
   a hollow metal o-ring seal positionable on the annular shoulder in the female member bore, the metal o-ring seal being axially compressible to sealingly engage the male member and the female member bore; and
   a seal retainer insertable into the bore, having a first end and a second end, the first end configured to contact the annular shoulder of the male member and the second end configured to contact the hollow metal o-ring seal to compress the seal axially.

2. The undersea hydraulic coupling of claim 1, wherein the metal o-ring seal is provided with at least one vent hole between the exterior and interior of the seal.

3. The undersea hydraulic coupling of claim 1, wherein the metal o-ring seal is pressure-energized to engage the male member and female member bore in response to fluid pressure in the coupling.

4. The undersea hydraulic coupling of claim 1, further comprising an axially compressible spring between the annular shoulder of the male member and the first end of the seal retainer.

5. The undersea hydraulic coupling of claim 1, further comprising locking means to limit axial movement of the seal retainer.

6. An undersea hydraulic coupling comprising:
   a male member having an internal bore extending therethrough, a slidable valve in the internal bore, and an outer annular shoulder;
   a female member having an internal bore with first and second shoulder surfaces therein, and a slidable valve in the internal bore; the male member dimensioned to be insertable into the female member bore and to slide past the first shoulder surface into a position adjacent the second shoulder surface;
   a flexible hollow metal o-shaped seal positionable on the first shoulder surface in the female member bore; and
   a seal retainer slidable into the female member bore, and having a first end configured to abut the outer annular shoulder of the male member as the male member is urged toward the second shoulder surface, whereby the retainer moves axially toward the first shoulder surface to compress the seal.

7. The undersea hydraulic coupling of claim 6 wherein the seal is vented to allow fluid to enter the seal and urge the seal to expand radially against the male member.

8. The undersea hydraulic coupling of claim 6 further comprising a spring washer between the outer annular shoulder of the male member and the first end of the seal retainer.

9. The undersea hydraulic coupling of claim 6 further comprising a clip engageable with the female member bore to hold the retainer in the bore.

10. An undersea hydraulic coupling, comprising:
    a probe member having a cylindrical outer surface, an annular shoulder on the outer surface, and valve means for controlling fluid flow through the probe member;
    a receiver having a receiving chamber for slidably receiving the probe member therein, an annular shoulder intermediate the receiving chamber, and valve means for controlling fluid flow therethrough;
    a seal retainer slidably inserted into the receiving chamber, the seal retainer having a rim portion dimensioned to abut the annular shoulder of the male member to urge the seal retainer axially toward the annular shoulder in the receiving chamber; and
    a hollow metal o-ring seal positionable on the annular shoulder in the receiving chamber, the seal being axially compressible between the seal retainer and the annular shoulder in the receiving chamber.

11. The undersea hydraulic coupling of claim 10, wherein the seal has at least one vent hole therein to allow fluid pressure to urge the seal radially against the probe and the receiving chamber.

12. The undersea hydraulic coupling of claim 10, further comprising spring means positionable between the seal retainer and the annular shoulder of the male member.

13. The undersea hydraulic coupling of claim 10 further comprising a locking device to prevent the seal retainer from sliding out of the receiving chamber.

* * * * *